US008311154B2

(12) United States Patent
Agrawal et al.

(10) Patent No.: US 8,311,154 B2
(45) Date of Patent: Nov. 13, 2012

(54) METHOD AND APPARATUS FOR PERFORMING JOINT DETECTION WITH A COMMON MIDAMBLE

(75) Inventors: Avneesh Agrawal, San Diego, CA (US); Juan Montojo, San Diego, CA (US); Kee-Bong Song, Santa Clara, CA (US); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 835 days.

(21) Appl. No.: 12/366,545

(22) Filed: Feb. 5, 2009

(65) Prior Publication Data

US 2010/0195747 A1 Aug. 5, 2010

(51) Int. Cl.
*H04L 27/00* (2006.01)
(52) U.S. Cl. ..................... 375/316; 375/260
(58) Field of Classification Search .......... 375/316–352
See application file for complete search history.

(56) References Cited

U.S. PATENT DOCUMENTS

| | | | | |
|---|---|---|---|---|
| 6,317,586 | B1 * | 11/2001 | Haardt ....................... | 455/67.16 |
| 7,336,599 | B2 * | 2/2008 | Hwang et al. ............... | 370/208 |
| 7,428,228 | B2 * | 9/2008 | Jeong et al. ................. | 375/220 |
| 2008/0219342 | A1 * | 9/2008 | Sambhwani et al. ......... | 375/316 |

FOREIGN PATENT DOCUMENTS

WO  WO2008042211 A2  4/2008

OTHER PUBLICATIONS

3GPP Organizational Partners, "3rd Generation Partnership Project; Technical Specification Group Radio Access Network; Physical channels and mapping of transport channels onto physical channels (TDD) (Release 8)", Mar. 2008, sections 5.2.3, 5.6, 5A.6, Annex A, 3GPP TS 25.221 V8.0.0.
International Search Report—PCT/US2010/020604—International Search Authority—European Patent Office, Apr. 23, 2010.
Kai Shi et al.: "Downlink Joint Detection for TD-SCDMA Systems: SNR Estimation and Active Codes Detection," Vehicular Technology Conference, 2005. Sep. 25-28, 2005, vol. 3, pp. 1519-1523.
Nasshan M M et al.: "Downlink Cellular Radio Capacity of a Joint Detection CDMA Mobile Radio System," Vehicular Technology Conference, 1995 IEEE 45TH Chicago, IL, USA, Jul. 25-28, 1995, vol. 1, pp. 474-478.
Peng Xue et al: "Improved Multi-Cell Joint Channel Estimation for TD-SCDMA Downlink," Vehicular Technology Conference, 2008. VTC Spring 2008. IEEE, May 11, 2008, pp. 1458-1462.

\* cited by examiner

*Primary Examiner* — Sam K Ahn
*Assistant Examiner* — Janice Tieu
(74) *Attorney, Agent, or Firm* — Peng Zhu; Kristine U. Ekwueme

(57) ABSTRACT

Techniques for performing joint detection with a common midamble for downlink transmission are described. In one design, a user equipment (UE) may obtain samples for a burst transmitted by a Node B on the downlink. The burst may include at least one data field and a common midamble. The UE may derive a channel impulse response estimate for each of multiple orthogonal codes based on (i) a channel impulse response estimate derived based on samples for the common midamble and (ii) a traffic-to-pilot ratio (T2P) estimated for that orthogonal code based on the samples for burst. The UE may perform joint detection, for the multiple orthogonal codes, on samples for the at least one data field based on the multiple channel impulse response estimates.

26 Claims, 7 Drawing Sheets

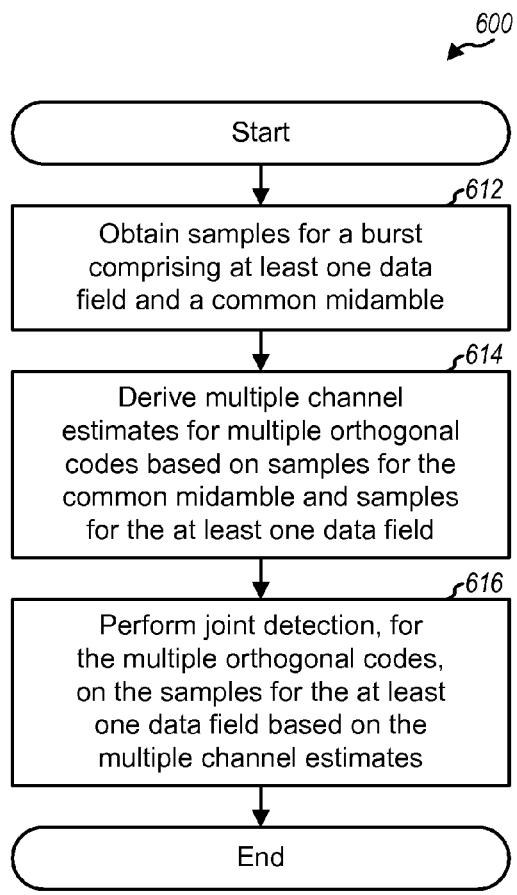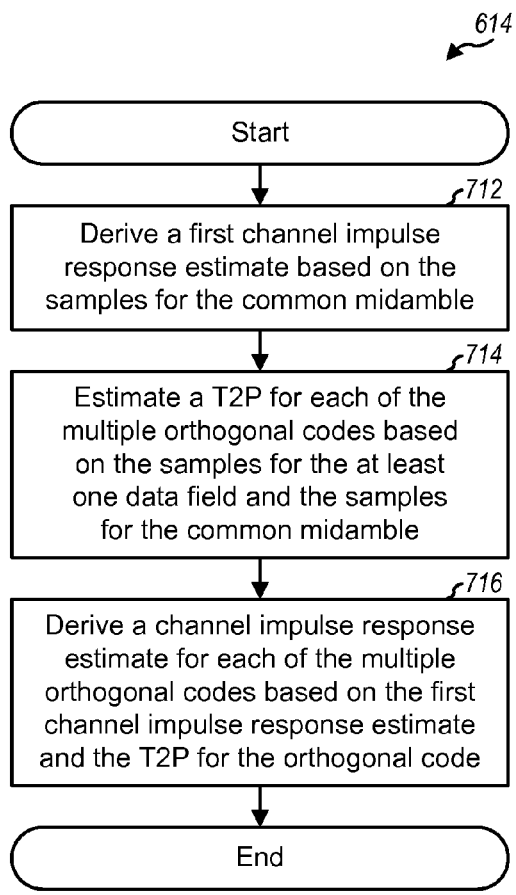
FIG. 6
FIG. 7

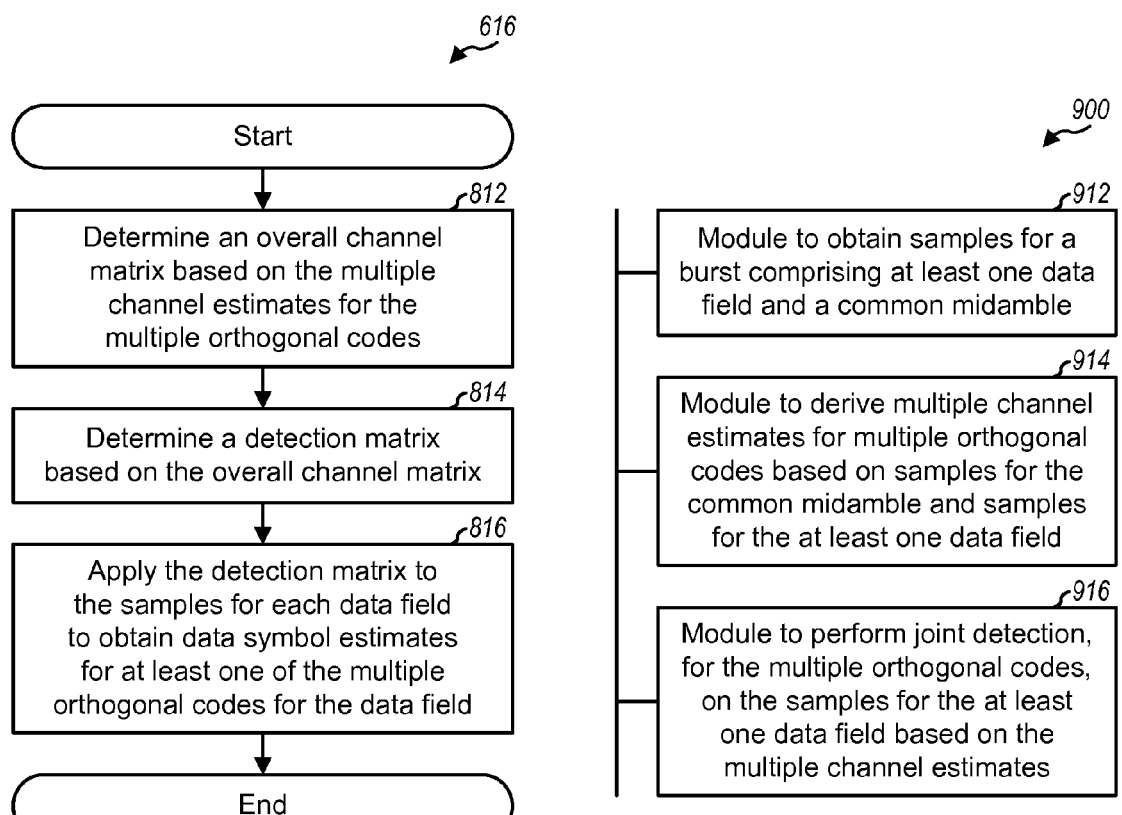

METHOD AND APPARATUS FOR PERFORMING JOINT DETECTION WITH A COMMON MIDAMBLE

BACKGROUND

I. Field

The present disclosure relates generally to communication, and more specifically to techniques for receiving a transmission in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data and a common midamble on the downlink to multiple user equipments (UEs). A midamble comprises known data and may also be referred to as a training sequence, pilot, reference, etc. A common midamble is a midamble that is sent to a group of UEs instead of a specific UE. A given UE may use the common midamble for channel estimation and/or other purposes. It may be desirable for each UE to recover the traffic data sent to that UE using the common midamble.

SUMMARY

Techniques for performing joint detection with a common midamble for downlink transmission are described herein. Joint detection refers to detection of traffic data for multiple orthogonal codes jointly instead of for each orthogonal code individually, which may improve performance. Joint detection may also be referred to as multi-user detection (MUD).

In one design, a UE may obtain samples for a burst transmitted by a Node B on the downlink. The burst may comprise at least one data field and a common midamble. The UE may derive multiple channel estimates for multiple orthogonal codes based on samples for the common midamble and samples for the at least one data field. The UE may then perform joint detection, for the multiple orthogonal codes, on the samples for the at least one data field based on the multiple channel estimates.

In one design of channel estimation, the UE may derive a first channel impulse response estimate based on the samples for the common midamble. The UE may estimate a traffic-to-pilot ratio (T2P) for each of the multiple orthogonal codes based on the samples for the at least one data field and the samples for the common midamble. The UE may then derive a channel impulse response estimate for each orthogonal code based on the first channel impulse response estimate and the T2P for that orthogonal code.

In one design of joint detection, the UE may determine an overall channel matrix based on the multiple channel estimates for the multiple orthogonal codes. The UE may determine a detection matrix based on the overall channel matrix. The UE may then apply the detection matrix to the samples for each data field to obtain data symbol estimates for at least one orthogonal code of interest for that data field. The UE may also perform joint detection for multiple orthogonal codes and multiple receive antennas, for multiple orthogonal codes and multiple cells, etc.

Various aspects and features of the disclosure are described in further detail below.

BRIEF DESCRIPTION OF THE DRAWINGS

FIG. 6 shows a process for receiving data on the downlink.
FIG. 7 shows a process for performing channel estimation.
FIG. 8 shows a process for performing joint detection.
FIG. 9 shows an apparatus for receiving data on the downlink.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA) Time Division Duplex (TDD), UTRA Frequency Division Duplex (FDD), cdma2000, etc. UTRA TDD includes 1.28, 3.84 and 7.68 megachips/second (Mcps) Options. UTRA TDD 3.84 and 7.68 Mcps Options are also referred to as Time Division CDMA (TD-CDMA) or High Chip Rate (HCR). UTRA TDD 1.28 Mcps Option is also referred to as Time Division Synchronous CDMA (TD-SCDMA) or Low Chip Rate (LCR). UTRA FDD includes Wideband CDMA (WCDMA) and other variants of CDMA. UTRA TDD and UTRA FDD are part of Universal Mobile Telecommunication System (UMTS). cdma2000 covers IS-2000, IS-856, and IS-95 standards. An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. Long Term Evolution (LTE) is an upcoming release of UMTS that uses E-UTRA, which employs OFDMA on the downlink and SC-FDMA on the uplink. UTRA, E-UTRA and LTE are described in documents from an organization named "3rd Generation Partnership Project" (3GPP). cdma2000 and UMB are described in documents from an organization named "3rd Generation Partnership Project 2" (3GPP2).

The techniques described herein may be used for the systems and radio technologies mentioned above as well as other systems and radio technologies. The techniques may also be used for data transmission on the downlink as well as the uplink. For clarity, certain aspects of the techniques are described below for data transmission on the downlink with TD-CDMA 3.84 Mcps Option. TD-CDMA is described in 3GPP TS 25.221, entitled "Physical channels and mapping of transport channels onto physical channels (TDD)," which is publicly available.

Figure 1:
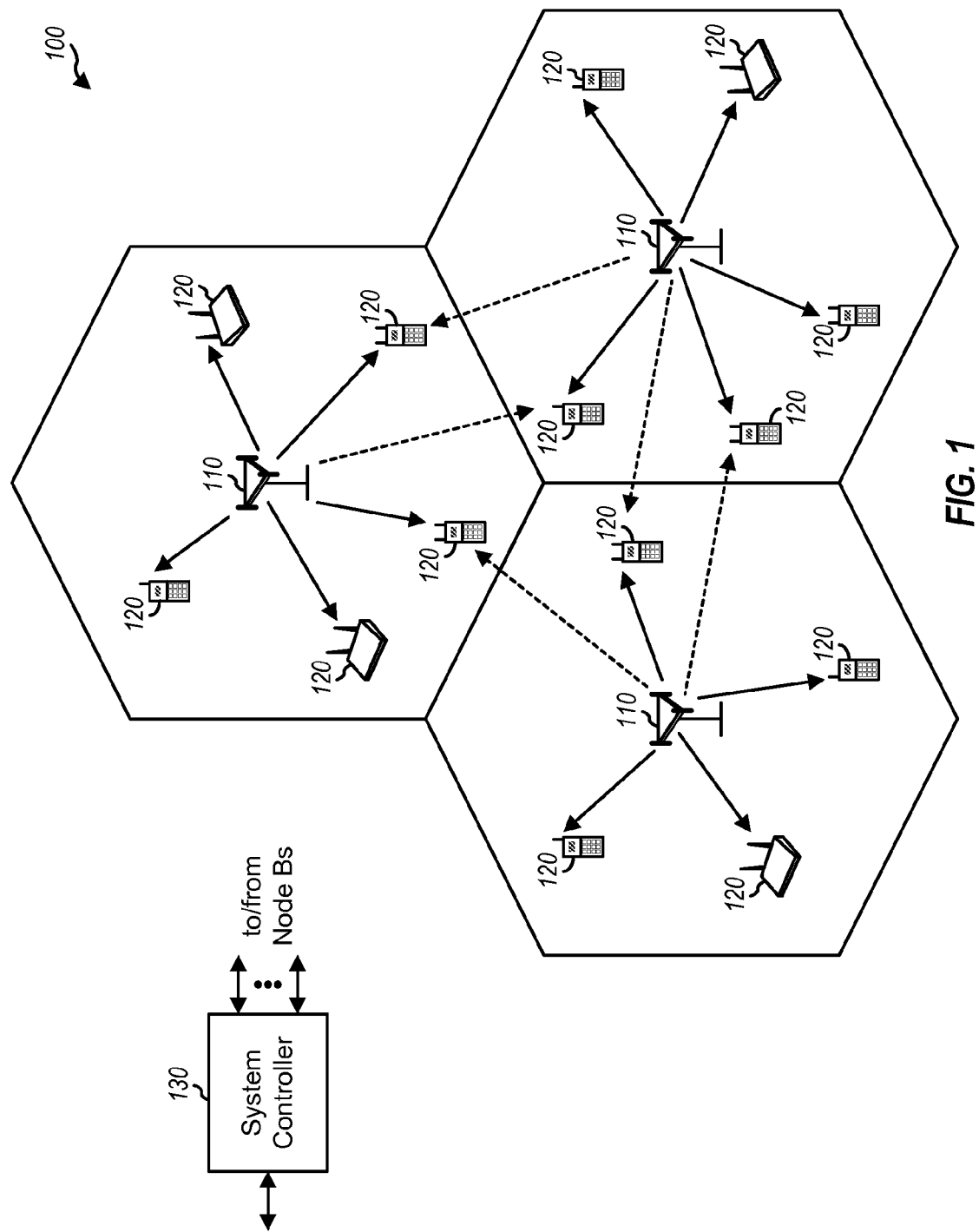
FIG. 1 shows a wireless communication system.

FIG. 1 shows a wireless communication system 100, which may be a Universal Terrestrial Radio Access Network (UTRAN) implementing TD-CDMA. System 100 may include a number of Node Bs 110 and other network entities. A Node B may be a station that communicates with the UEs and may also be referred to as an evolved Node B (eNode B), a base station, an access point, etc. Each Node B 110 may provide communication coverage for a particular geographic area. The overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below. A system controller 130 may couple to Node Bs 110 and provide coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless device, a handheld device, a wireless modem, a laptop computer, etc. A UE may communicate with a Node B on the downlink and/or uplink. The downlink (or forward link) refers to the communication link from the Node B to the UE, and the uplink (or reverse link) refers to the communication link from the UE to the Node B. For clarity, FIG. 1 shows only transmissions on the downlink. In FIG. 1, a solid line with a single arrow indicates a data transmission to a specific UE. A dashed line with a single arrow indicates an interfering transmission at a UE. For simplicity, FIG. 1 shows only some of the interfering transmissions. In the description below, the terms "UE" and "user" are used interchangeably.

In TD-CDMA, the timeline for transmission is divided into units of radio frames. Each radio frame has a duration of 10 milliseconds (ms) and is further partitioned into 15 slots. Each slot includes 2560 chips and has a duration of 0.667 ms for the 3.84 Mcps Option. Each slot may be allocated to either the downlink or uplink. The transmission in each slot is referred to as a burst.

Figure 2:
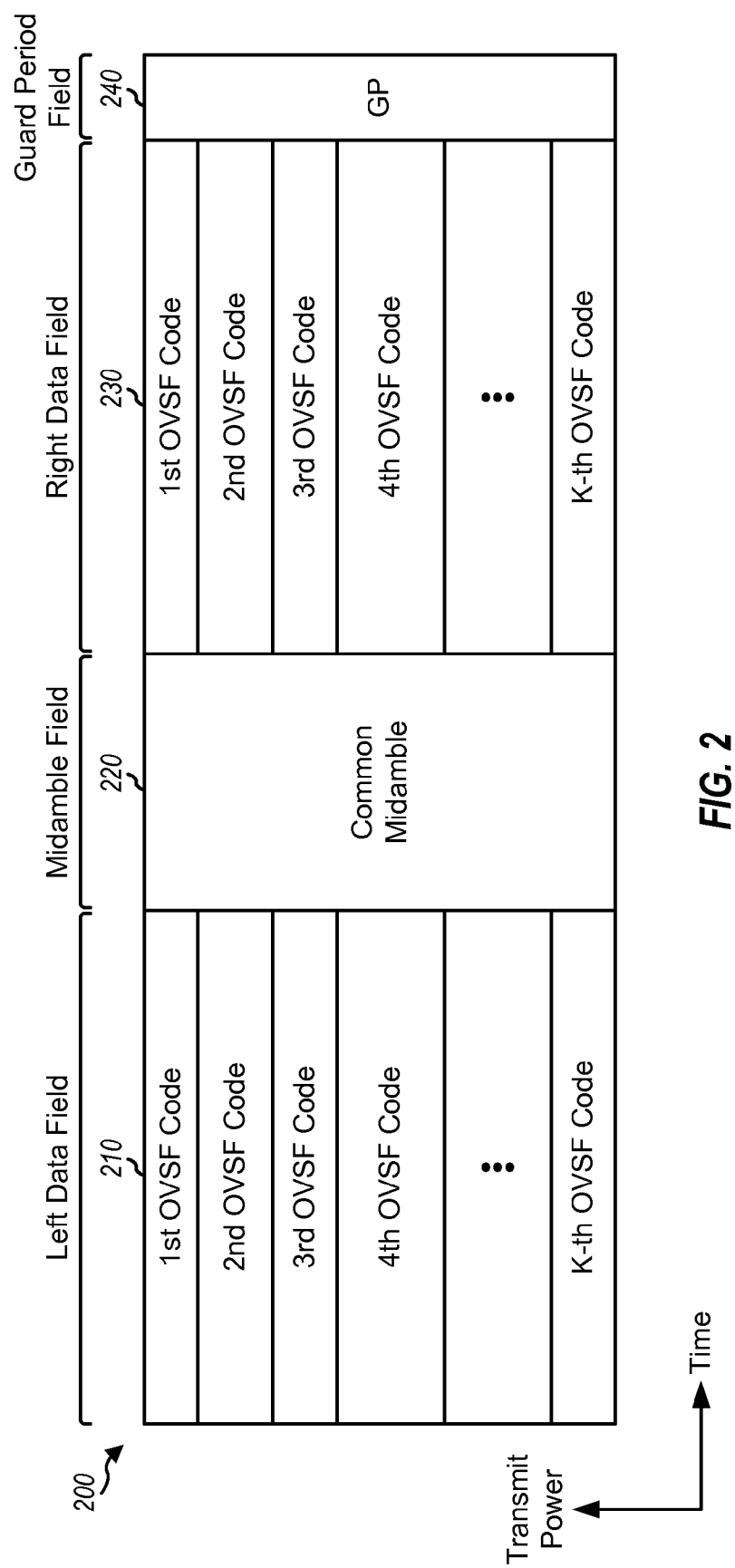
FIG. 2 shows an example burst for the downlink in TD-CDMA.

FIG. 2 shows an example burst 200 for the downlink in TD-CDMA. Burst 200 includes a left data field 210, a midamble field 220, a right data field 230, and a guard period (GP) field 240. Four burst types 1 through 4 are defined in TD-CDMA, and each burst type specifies the lengths of the four fields in a burst. For burst type 1, left data field 210 has a length of 976 chips, midamble field 220 has a length of 512 chips, right data field 230 has a length of 976 chips, and guard period field 240 has a length of 96 chips. Data fields 210 and 230 may also be referred to as left and right data portions, respectively.

Traffic data for U users may be sent in data fields 210 and 230 using K orthogonal variable spreading factor (OVSF) codes, where $K \geq 1$ and $1 \geq U \leq K$. The OVSF codes may also be referred to as orthogonal codes, spreading codes, code channels, traffic channels, etc. Each user may be assigned one or more OVSF codes for data transmission. The traffic data for each user may be scaled based on the transmit power to use for that user and further spread with the OVSF code(s) assigned to that user. Different transmit power levels may be used for different users. These users may be at different locations and may thus require different power levels to achieve satisfactory performance.

A common midamble may be sent in midamble field 220. The common midamble may comprise data that is known to all users and may be used for channel estimation and other purposes. No transmission is sent in guard period field 240.

Figure 3:
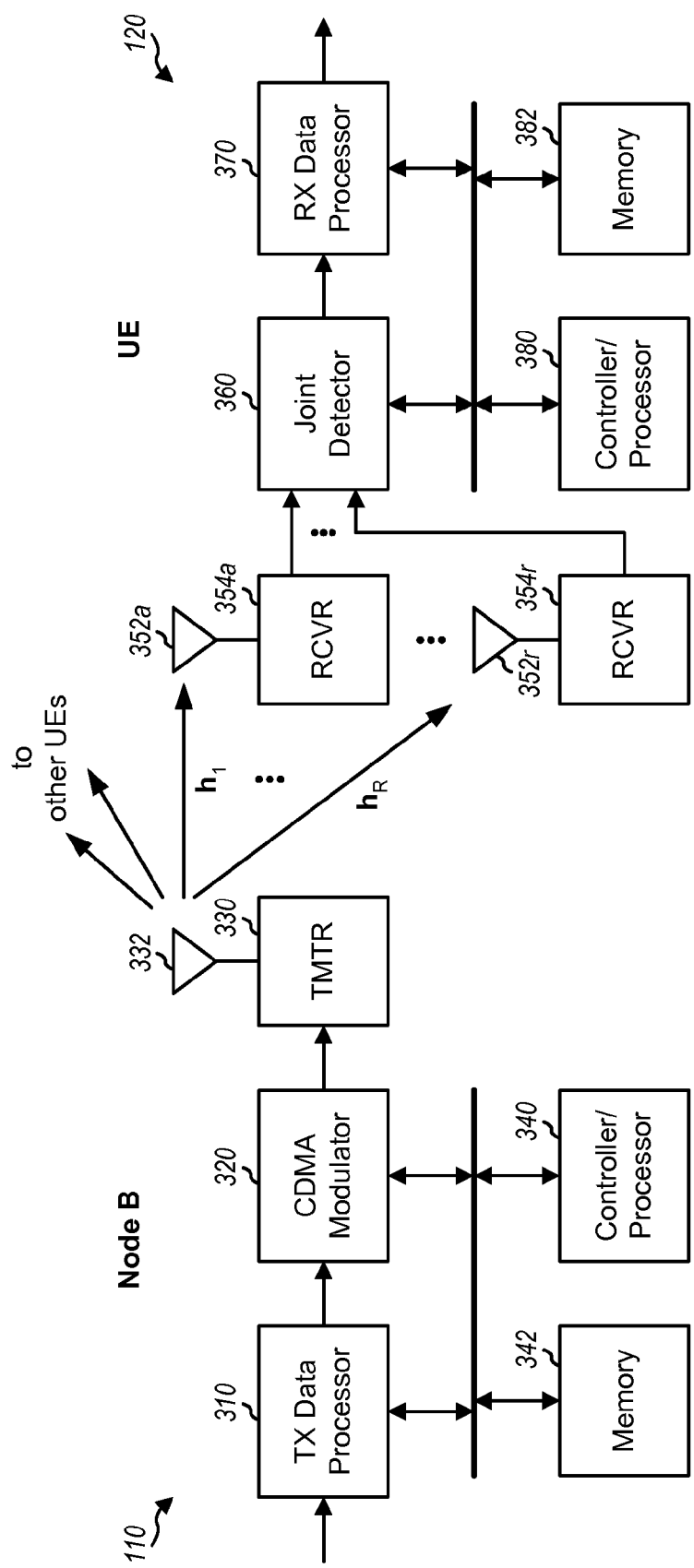
FIG. 3 shows a block diagram of a Node B and a UE.

FIG. 3 shows a block diagram of a design of a Node B 110 and a UE 120, which may be one of the Node Bs and one of the UEs in FIG. 1. FIG. 3 shows Node B 110 equipped with one transmit antenna and UE 120 equipped with R receive antennas, where $R \geq 1$. In general, Node B 110 and UE 120 may each be equipped with any number of antennas. For simplicity, FIG. 3 shows only processing units for data transmission on the downlink.

At Node B 110, a transmit (TX) data processor 310 may receive traffic data for the UEs being served, process (e.g., encode, interleave, and symbol map) the traffic data for each UE, and provide data symbols for all UEs to a CDMA modulator 320. A data symbol is a modulation symbol for data, a modulation symbol is a complex value for a point in a signal constellation (e.g., for M-PSK or M-QAM), and a symbol may be a real or complex value. CDMA modulator 320 may process (e.g., spread and scramble) the data symbols for the UEs, generate and multiplex a common midamble, and provide data and midamble chips. A transmitter (TMTR) 330 may process (e.g., convert to analog, amplify, filter, and frequency upconvert) the data and midamble chips and generate a downlink signal, which may be transmitted via an antenna 332.

At UE 120, R antennas 352a through 352r may receive the downlink signals from Node B 110 and possibly other Node Bs and may provide R received signals to R receivers (RCVR) 354a through 354r, respectively. Each receiver 354 may process (e.g., filter, amplify, frequency downconvert, and digitize) its received signal and provide received samples to a joint detector 360. Detector 360 may perform joint detection on the received samples from all R receive antennas for all OVSF codes of interest and provide data symbol estimates, which are estimates of the data symbols for UE 120. A receive (RX) data processor 370 may process (e.g., symbol demap, deinterleave, and decode) the data symbol estimates and provide decoded data for UE 120. In general, the processing by joint detector 360 and RX data processor 370 is complementary to the processing by CDMA modulator 320 and TX data processor 310, respectively, at Node B 110.

Controllers/processors 340 and 380 may direct operation at Node B 110 and UE 120, respectively. Memories 342 and 382 may store data and program codes for Node B 110 and UE 120, respectively.

Figure 4:
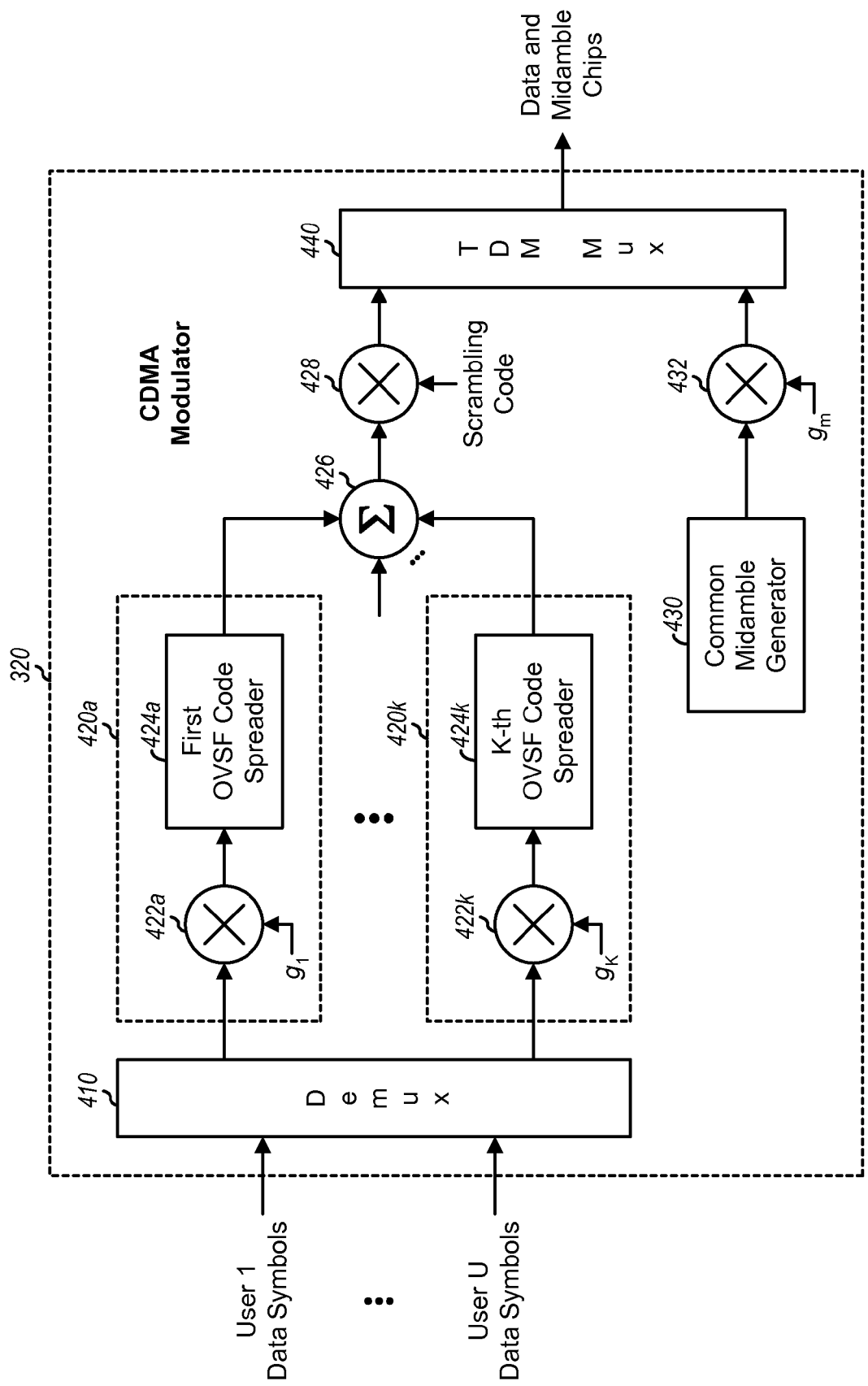
FIG. 4 shows a block diagram of a CDMA modulator for one cell.

FIG. 4 shows a block diagram of a design of CDMA modulator 320 for one cell at Node B 110 in FIG. 3. For simplicity, the following description assumes that K OVSF codes with the same spreading factor of Q are used for a burst, where Q may be equal to 1, 2, 4, 8, 16, or some other value, and $1 \leq K \leq Q$. In general, OVSF codes of the same or different lengths may be used for transmission. Q may then correspond to the length of the longest OVSF code.

Within CDMA modulator 320, a demultiplexer (Demux) 410 may receive data symbols for U users from TX data processor 310 and may provide the data symbols to K OVSF code processors 420a through 420k for K OVSF codes. Each user may be assigned one or more OVSF codes. Demultiplexer 410 may provide the data symbols for each user to one or more OVSF code processors 420 for the one or more OVSF codes assigned to that user.

Within each OVSF code processor 420, a multiplier 422 may scale its data symbols with a gain determined based on the transmit power to use for the associated OVSF code. A spreader 424 may spread the scaled data symbols from multiplier 422 with an OVSF code assigned to that spreader and provide spread chips. The spreading may be performed by repeating each scaled data symbol to generate Q replicated symbols and multiplying the Q replicated symbols with the Q chips of the OVSF code to generate Q spread chips for that data symbol. A combiner 426 may receive and sum the spread chips from all K spreaders 424a through 424k for the K OVSF codes. A multiplier 428 may multiply the combined chips from combiner 426 with a scrambling code for the cell and provide data chips for the data fields.

The processing by CDMA modulator 320 for each OVSF code may be expressed as:

$$x_{n,q}^k = d_n^k \cdot g_k \cdot c_q^k \cdot s_q, \text{ for } k=1,\ldots,K, q=1,\ldots,Q, \text{ and } n=1,\ldots,N, \quad \text{Eq (1)}$$

where $s_q$ is the q-th chip of the scrambling code,
$c_q^k$ is the q-th chip of the k-th OVSF code,
$g_k$ is a gain for the k-th OVSF code,
$d_n^k$ is a data symbol sent in symbol period n with the k-th OVSF code, and
$x_{n,q}^k$ is a data chip sent in chip period q of symbol period n for the k-th OVSF code.

N data symbols may be sent with one OVSF code in each data field, where N is dependent on the length of the data field and the spreading factor Q.

The spreading and scrambling for each OVSF code may be expressed as:

$$a_q^k = c_q^k \cdot s_q, \quad \text{Eq (2)}$$

where $a_q^k$ is a scrambling and spreading chip for the k-th OVSF code.

A generator 430 may generate chips for a common midamble for the cell. A multiplier 432 may scale the chips from generator 430 with a gain $g_m$ determined based on the transmit power for the common midamble. A multiplexer (Mux) 440 may receive the data chips from multiplier 428 and the midamble chips from multiplier 432, provide the data chips during time intervals for the data fields, and provide the midamble chips during the time interval for the midamble field. The data chips and midamble chips may be further processed and transmitted to the recipient UEs.

Referring back to FIG. 3, UE 120 may receive the downlink transmission from Node B 110 via R receive antennas. The impulse response of the wireless channel from transmit antenna 332 at Node B to each receive antenna 352 at UE 120 may be expressed as:

$$h_r = [h_{1,r} h_{2,r} \ldots h_{L,r}]^T, \text{ for } r=1,\ldots,R, \quad \text{Eq (3)}$$

where $h_r$ is an L×1 vector of the channel impulse response for receive antenna r,
$h_{\Lambda,r}$ is the Λ-th channel tap in the channel impulse response, with $\Lambda=1,\ldots,L$,
L is the length of the channel impulse response, and
"T" denotes a transpose.

For clarity, in the description herein, vectors are denoted with bolded lower case text (e.g., h), matrices are denoted with bolded upper case text (e.g., H), scalars are denoted with italic lower case text (e.g., h), and constants are denoted with upper case text (e.g., L).

UE 120 may estimate the channel impulse response for each receive antenna based on the common midamble sent by Node B 110. The common midamble may be expressed as:

$$m = [m_1 \, m_2 \ldots m_{P_m}]^T, \quad \text{Eq (4)}$$

where m is a $P_m \times 1$ vector of the common midamble,
$m_i$ is the i-th chip of the common midamble, with $i=1,\ldots,P_m$, and
$P_m$ is the length of the common midamble.

$P_m$ is determined by the duration of the midamble field and may be different for different burst types. The first P chips of the common midamble are defined based on a cell-specific midamble code. The $P_m-P$ remaining chips of the common midamble are copies of the beginning chips, as follows:

$$m_i = m_{i-P}, \text{ for } i=P+1,\ldots,P_m. \quad \text{Eq (5)}$$

In one design, for burst type 1, the parameter values may be as follows:

$$P=456, P_m=512, K=8, L=57, T=456, \text{ and } P=P_m-L+1. \quad \text{Eq (6)}$$

In the above design, the last 56 chips of the common midamble are copies of the first 56 chips of the midamble. This common midamble can support eight OVSF codes with a channel impulse response length of 57, for a total of 456 channel taps. In general, for a given value of P, the product of K and L should be equal to or less than P.

UE 120 may obtain a set of received samples at the chip rate from each receive antenna for a burst transmitted by Node B 110. For each receive antenna, the first L−1 received samples for the common midamble may be affected by intersymbol interference (ISI) from the last L−1 chips in left data field 210. Thus, the first L−1 received samples for the common midamble may be discarded, and the remaining P received samples may be used for channel estimation. The P received samples from one receive antenna r for the common midamble may be expressed as:

$$z_r = G \, h_r + n_r, \text{ for } r=1,\ldots,R, \quad \text{Eq (7)}$$

where $z_r = [z_{1,r} \, z_{2,r} \ldots z_{P,r}]^T$ is a P×1 vector of received samples from antenna r for the common midamble,
G is a P×L common midamble matrix, and
$n_r = [n_{1,r} \, n_{2,r} \ldots n_{P,r}]^T$ is a P×1 vector of interference and noise for antenna r.

For burst type 1, P×L may be equal to 456×57, and the common midamble matrix G may be expressed as:

$$G = \begin{bmatrix} m_{57} & m_{56} & \cdots & m_1 \\ m_{58} & m_{57} & \cdots & m_2 \\ \vdots & \vdots & \ddots & \vdots \\ m_{512} & m_{511} & \cdots & m_{456} \end{bmatrix}. \quad \text{Eq (8)}$$

In general, the element in the i-th row and j-th column of matrix G may be given as $g_{ij} = m_{L+i-j}$, for $i=1,\ldots,P$ and $j=1,\ldots,L$.

The channel impulse response for each receive antenna may be estimated in various manners. In one design, the channel impulse response may be estimated based on a maximum likelihood channel estimator. For this design, a channel estimation matrix may be derived as follows:

$$C_r = [G^H R_{n,r}^{-1} G]^{-1} G^H R_{n,r}^{-1}, \quad \text{Eq (9)}$$

where $C_r$ is an L×P maximum likelihood channel estimation matrix for receive antenna r,
$R_{n,r}$ is a P×P noise covariance matrix for receive antenna r, and
"H" denotes a conjugate transpose or Hermitian.

The noise covariance matrix $R_{n,r}$ may be expressed as:

$$R_{n,r} = E\{n_r n_r^H\}, \quad \text{Eq (10)}$$

where E{ } denotes an expectation.

The interference and noise at each receive antenna may be assumed to be additive white Gaussian noise (AWGN) with zero mean and a variance of $\sigma^2$. In this case, the noise covariance matrix may be given as $R_{n,r} = \sigma^2 \cdot I$, where I is an identity matrix with ones along the diagonal and zeros elsewhere. An L×P channel estimation matrix $C_a$ may then be expressed as:

$$C_a = [G^H G]^{-1} G^H. \quad \text{Eq (11)}$$

The channel estimation matrix $C_a$ may also be referred to as a pseudo-inverse of G.

In another design, an L×P channel estimation matrix $C_b$ may be defined based on a discrete Fourier transform (DFT) matrix, as follows:

$$C_b = G^{-1} = \frac{1}{\sqrt{P}} \cdot [W^H \Lambda W], \qquad \text{Eq (12)}$$

where W is a P×P DFT matrix and $\Lambda$ is a P×P diagonal matrix.

The element $w_{uv}$ in the u-th row and v-th column of the DFT matrix W may be expressed as:

$$w_{uv} = \frac{1}{\sqrt{P}} \cdot e^{-j2\pi(u-1)(v-1)/P}, \text{ for } u, v = 1, \ldots, P. \qquad \text{Eq (13)}$$

The diagonal matrix $\Lambda$ contains non-zero values along the diagonal and zeros elsewhere. The diagonal element $\lambda_v$ in the v-th row and v-th column of matrix $\Lambda$ may be expressed as:

$$\lambda_v = \frac{1}{(Wg_1)_v}, \text{ for } v = 1, \ldots, P, \qquad \text{Eq (14)}$$

where $g_1$ is a P×1 vector formed by the first column of matrix G, and $(W g_1)_v$ denotes the v-th element in a P×1 vector $W g_1$.

The channel estimation matrix may also be derived in other manners. In any case, the channel impulse response for each receive antenna may be estimated as follows:

$$\hat{h}_r = C z_r, \qquad \text{Eq (15)}$$

where C is an L×P channel estimation matrix, which may be equal to $C_r$, $C_a$ or $C_b$, and $\hat{h}_r$ is an L×1 vector of channel impulse response estimate for receive antenna r.

Vector $\hat{h}_r$ is an estimate of vector $h_r$ for receive antenna r. As shown in equation (15), the channel impulse response may be estimated for each receive antenna based on the received samples from that antenna for the common midamble. The channel impulse response for each receive antenna may also be estimated based on some other channel estimation techniques.

In one design, K channel impulse responses for the K OVSF codes for each receive antenna may be estimated as follows:

$$\hat{h}_r^k = \hat{h}_r \cdot T2P_r^k, \text{ for } k=1, \ldots, K, \qquad \text{Eq (16)}$$

where $\hat{h}_r^k$ is an L×1 vector of channel impulse response estimate for the k-th OVSF code for receive antenna r, and $T2P_r^k$ is a traffic-to-pilot ratio (T2P) of the k-th OVSF code for receive antenna r.

As shown in equation (16), for each receive antenna, the K OVSF codes observe the same channel impulse response $h_r$ from transmit antenna 332 at Node B 110 to that receive antenna at UE 120. However, the channel impulse response for each OVSF code is scaled by the T2P for that OVSF code. The T2Ps for all K OVSF codes may be estimated by UE 120 based on the received samples for the data fields and the received samples for the common midamble.

Each data field may carry N data symbols in N symbol periods for each OVSF code of length Q used for transmission. UE 120 may descramble the received samples with the scrambling code used by Node B 110 to obtain descrambled samples. UE 120 may then perform a Q-point fast Hadamard transform (FHT) for each symbol period to obtain Q despread symbols for that symbol period. These Q despread symbols are estimates of data symbols sent with Q possible OVSF codes in the symbol period. UE 120 may estimate the energy-per-symbol for each OVSF code, as follows:

$$E_r^k = \frac{1}{2N} \cdot \sum_n |\tilde{d}_{n,r}^k|^2, \text{ for } k = 1, \ldots, Q, \qquad \text{Eq (17)}$$

where $\tilde{d}_{n,r}^k$ is a despread symbol for the k-th OVSF code in symbol period n for receive antenna r.

UE 120 may estimate the energy-per-chip $E_{mid}$ of the common midamble, as follows:

$$E_{mid,r} = \frac{1}{P} \cdot \sum_i |z_{i,r}|^2. \qquad \text{Eq (18)}$$

UE 120 may then compute the T2P for each OVSF code, as follows:

$$T2P_r^k = \sqrt{\frac{E_{mid,r}}{E_r^k/Q}}. \qquad \text{Eq (19)}$$

The received samples for one data field may be expressed as:

$$y = T d + n, \qquad \text{Eq (20)}$$

where d is a K·N×1 vector of all data symbols sent with K OVSF codes in the data field, T is an R·(N·Q+L−1)×K·N overall channel matrix for the K OVSF codes, y is an R·(N·Q+L−1)×1 vector of all received samples for the data field, and n is an R·(N·Q+L−1)×1 vector of interference and noise.

The data vector d may be expressed as:

$$d = \begin{bmatrix} \underbrace{d_1^1 \ldots d_1^K}_{\substack{K \text{ data symbols for} \\ \text{1st symbol period}}} & \underbrace{d_2^1 \ldots d_2^K}_{\substack{K \text{ data symbols for} \\ \text{2nd symbol period}}} & \ldots & \underbrace{d_N^1 \ldots d_N^K}_{\substack{K \text{ data symbols for} \\ \text{last symbol period}}} \end{bmatrix}^T, \qquad \text{Eq (21)}$$

where $d_n^k$ is a data symbol sent in symbol period n with the k-th OVSF code.

The received vector y may be expressed as:

$$y = \begin{bmatrix} \underbrace{\overbrace{y_{1,1}^1 \cdots y_{1,1}^R}^{\text{samples from R antennas}} \cdots \overbrace{y_{1,Q}^1 \cdots y_{1,Q}^R}^{\text{samples from R antennas}}}_{\text{received samples for 1st symbol period}} \\ \vdots \\ \underbrace{\overbrace{y_{N,1}^1 \cdots y_{N,1}^R}^{\text{samples from R antennas}} \cdots \overbrace{y_{N,Q}^1 \cdots y_{N,Q}^R}^{\text{samples from R antennas}}}_{\text{received samples for last symbol period}} \end{bmatrix}^T \quad \text{Eq (22)}$$

where $y_{n,q}^r$ is a received sample from antenna r in chip period q of symbol period n.

The overall channel matrix T is a function of the K OVSF codes, the scrambling code, and the K channel impulse responses for the K OVSF codes for each receive antenna. The structure of matrix T is illustrated below for a simple example with the following parameter values:

$$N=2, Q=4, R=2, K=2, L=1. \quad \text{Eq (23)}$$

$R \cdot (N \cdot Q + L - 1) = 2(2 \cdot 4 + 1 - 1) = 16$ rows for matrix $T$.

$K \cdot N = 2 \cdot 2 = 4$ columns for matrix $T$.

The elements of matrix T may be defined based on the following:

$h_{\Lambda,r}^k$ is the $\Lambda$-th channel tap for the k-th OVSF code for receive antenna r, and $a_q^k$ is the q-th scrambling and spreading chip for the k-th OVSF code.

The scrambling and spreading chips $a_q^k$ may be obtained as shown in equation (2).

For the example above, there are four channel taps $h_{1,1}^1$, $h_{1,2}^1$, $h_{1,1}^2$ and $h_{1,2}^2$ for the four channel impulse responses for two OVSF codes and two receive antennas. Equation (20) may then be expressed as:

$$y_{16 \times 1} = \begin{bmatrix} h_{1,1}^1 \cdot a_1^1 & h_{1,1}^2 \cdot a_1^2 & 0 & 0 \\ h_{1,2}^1 \cdot a_1^1 & h_{1,2}^2 \cdot a_1^2 & 0 & 0 \\ h_{1,1}^1 \cdot a_2^1 & h_{1,1}^2 \cdot a_2^2 & 0 & 0 \\ h_{1,2}^1 \cdot a_2^1 & h_{1,2}^2 \cdot a_2^2 & 0 & 0 \\ h_{1,1}^1 \cdot a_3^1 & h_{1,1}^2 \cdot a_3^2 & 0 & 0 \\ h_{1,2}^1 \cdot a_3^1 & h_{1,2}^2 \cdot a_3^2 & 0 & 0 \\ h_{1,1}^1 \cdot a_4^1 & h_{1,1}^2 \cdot a_4^2 & 0 & 0 \\ h_{1,2}^1 \cdot a_4^1 & h_{1,2}^2 \cdot a_4^2 & 0 & 0 \\ 0 & 0 & h_{1,1}^1 \cdot a_1^1 & h_{1,1}^2 \cdot a_1^2 \\ 0 & 0 & h_{1,2}^1 \cdot a_1^1 & h_{1,2}^2 \cdot a_1^2 \\ 0 & 0 & h_{1,1}^1 \cdot a_2^1 & h_{1,1}^2 \cdot a_2^2 \\ 0 & 0 & h_{1,2}^1 \cdot a_2^1 & h_{1,2}^2 \cdot 2_2^2 \\ 0 & 0 & h_{1,1}^1 \cdot a_3^1 & h_{1,1}^2 \cdot a_3^2 \\ 0 & 0 & h_{1,2}^1 \cdot a_3^1 & h_{1,2}^2 \cdot a_3^2 \\ 0 & 0 & h_{1,1}^1 \cdot a_4^1 & h_{1,1}^2 \cdot a_4^2 \\ 0 & 0 & h_{1,2}^1 \cdot a_4^1 & h_{1,2}^2 \cdot a_4^2 \end{bmatrix} \begin{bmatrix} d_1^1 \\ d_1^2 \\ d_2^1 \\ d_2^2 \end{bmatrix} + n_{16 \times 1} \quad \text{Eq (24)}$$

In the simple example given above, where is one channel tap for each channel impulse response. If $L=2$, then equation (24) may be expressed as:

$$y_{18 \times 1} = \begin{bmatrix} h_{1,1}^1 \cdot a_1^1 & h_{1,1}^2 \cdot a_1^2 & 0 & 0 \\ h_{1,2}^1 \cdot a_1^1 & h_{1,2}^2 \cdot a_1^2 & 0 & 0 \\ h_{1,1}^1 \cdot a_2^1 + h_{2,1}^1 \cdot a_1^1 & h_{1,1}^2 \cdot a_2^2 + h_{2,1}^2 \cdot a_1^2 & 0 & 0 \\ h_{1,2}^1 \cdot a_2^1 + h_{2,2}^1 \cdot a_1^1 & h_{1,2}^2 \cdot a_2^2 + h_{2,2}^2 \cdot a_1^2 & 0 & 0 \\ h_{1,1}^1 \cdot a_3^1 + h_{2,1}^1 \cdot a_2^1 & h_{1,1}^2 \cdot a_3^2 + h_{2,1}^2 \cdot a_2^2 & 0 & 0 \\ h_{1,2}^1 \cdot a_3^1 + h_{2,2}^1 \cdot a_2^1 & h_{1,2}^2 \cdot a_3^2 + h_{2,2}^2 \cdot a_2^2 & 0 & 0 \\ h_{1,1}^1 \cdot a_4^1 + h_{2,1}^1 \cdot a_3^1 & h_{1,1}^2 \cdot a_4^2 + h_{2,1}^2 \cdot a_3^2 & 0 & 0 \\ h_{1,2}^1 \cdot a_4^1 + h_{2,2}^1 \cdot a_3^1 & h_{1,2}^2 \cdot a_4^2 + h_{2,2}^2 \cdot a_3^2 & 0 & 0 \\ h_{2,1}^1 \cdot a_4^1 & h_{2,1}^2 \cdot a_4^2 & h_{1,1}^1 \cdot a_1^1 & h_{1,1}^2 \cdot a_1^2 \\ h_{2,2}^1 \cdot a_4^1 & h_{2,2}^2 \cdot a_4^2 & h_{1,2}^1 \cdot a_1^1 & h_{1,2}^2 \cdot a_1^2 \\ 0 & 0 & h_{1,1}^1 \cdot a_2^1 + h_{2,1}^1 \cdot a_1^1 & h_{1,1}^2 \cdot a_2^2 + h_{2,1}^2 \cdot a_1^2 \\ 0 & 0 & h_{1,2}^1 \cdot a_2^1 + h_{2,2}^1 \cdot a_1^1 & h_{1,2}^2 \cdot a_2^2 + h_{2,2}^2 \cdot a_1^2 \\ 0 & 0 & h_{1,1}^1 \cdot a_3^1 + h_{2,1}^1 \cdot a_2^1 & h_{1,1}^2 \cdot a_3^2 + h_{2,1}^2 \cdot a_2^2 \\ 0 & 0 & h_{1,2}^1 \cdot a_3^1 + h_{2,2}^1 \cdot a_2^1 & h_{1,2}^2 \cdot a_3^2 + h_{2,2}^2 \cdot a_2^2 \\ 0 & 0 & h_{1,1}^1 \cdot a_4^1 + h_{2,1}^1 \cdot a_3^1 & h_{1,1}^2 \cdot a_4^2 + h_{2,1}^2 \cdot a_3^2 \\ 0 & 0 & h_{1,2}^1 \cdot a_4^1 + h_{2,2}^1 \cdot a_3^1 & h_{1,2}^2 \cdot a_4^2 + h_{2,2}^2 \cdot a_3^2 \\ 0 & 0 & h_{2,1}^1 \cdot a_4^1 & h_{2,1}^2 \cdot a_4^2 \\ 0 & 0 & h_{2,2}^1 \cdot a_4^1 & h_{2,2}^2 \cdot a_4^2 \end{bmatrix} \begin{bmatrix} d_1^1 \\ d_1^2 \\ d_2^1 \\ d_2^2 \end{bmatrix} + n_{18 \times 1}$$

In general, matrix T contains K·N columns, with the first K columns corresponding to K data symbols sent with K OVSF codes in the first symbol period, the next K columns corresponding to K data symbols sent with the K OVSF codes in the second symbol period, and so on, and the last K columns corresponding to K data symbols sent with the K OVSF codes in the last symbol period. Each column of matrix T contains R(Q+L−1) non-zero elements, or Q+L−1 non-zero elements for each of the R receive antennas. The Q+L−1 non-zero elements for each receive antenna may be obtained by convolving the Q scrambling and spreading chips for one OVSF code with the L channel taps of the channel impulse response estimate for that receive antenna and that OVSF code. Every R·Q rows, starting from the top of matrix T, correspond to one symbol period. The non-zero elements of the K·N columns of matrix T are arranged such that the non-zero elements of the first K columns for the first symbol period start at row 1, the non-zero elements of the next K columns for the second symbol period start at row R·Q+1, and so on, and the non-zero elements of the last K columns for the last symbol period start at row (N−1)·R·Q+1.

UE 120 may perform joint detection to obtain an estimate of the data vector d sent by Node B 110. In one design, the data vector d may be estimated based on a matched filter detector. For this design, a detection matrix may be derived as follows:

$$M_{mf} = T^H,  \quad \text{Eq (25)}$$

where $M_{mf}$ is a matched filter detection matrix.

In another design, the data vector d may be estimated based on a least squares detector, which is also commonly referred to as a zero forcing detector. For this design, a detection matrix may be derived as follows:

$$M_{ls} = [T^H T]^{-1} T^H, \quad \text{Eq (26)}$$

where $M_{ls}$ is a least squares detection matrix.

In yet another design, the data vector d may be estimated based on a minimum mean square error (MMSE) detector. For this design, a detection matrix may be derived as follows:

$$M_{mmse} = [T^H R_n^{-1} T + R_1^{-1}]^{-1} T^H R_n^{-1}, \quad \text{Eq (27)}$$

where $M_{mmse}$ is an MMSE detection matrix, and
$R_d = E\{d\ d^H\}$ is a covariance matrix of the data vector d.

The interference and noise may be assumed to be AWGN with zero mean, a variance of $\sigma^2$, and a covariance matrix of $R_n = \sigma^2 \cdot I$. The data symbols may be assumed to be uncorrelated with a covariance matrix of $R_d = I$. In this case, a detection matrix $M_a$ may be expressed as:

$$M_a = [T^H T + \sigma^2 I]^{-1} T^H. \quad \text{Eq (28)}$$

The detection matrix $M_a$ approaches the least squares detection matrix $M_{ls}$ if $\sigma^2 \to 0$ and approaches the matched filter detection matrix $M_{mf}$ if $\sigma^2 \to \infty$.

The data vector d may be estimated as follows:

$$\hat{d} = M y, \quad \text{Eq (29)}$$

where M is a detection matrix, which may be equal to $M_{mf}$, $M_{ls}$, $M_{mmse}$ or $M_a$, and
d is a vector of data symbol estimates for all OVSF codes and symbol periods.

The joint detection may also be performed based on some other detection techniques. Vector d̂ is an estimate of vector d of data symbols sent in the data fields.

Figure 5:
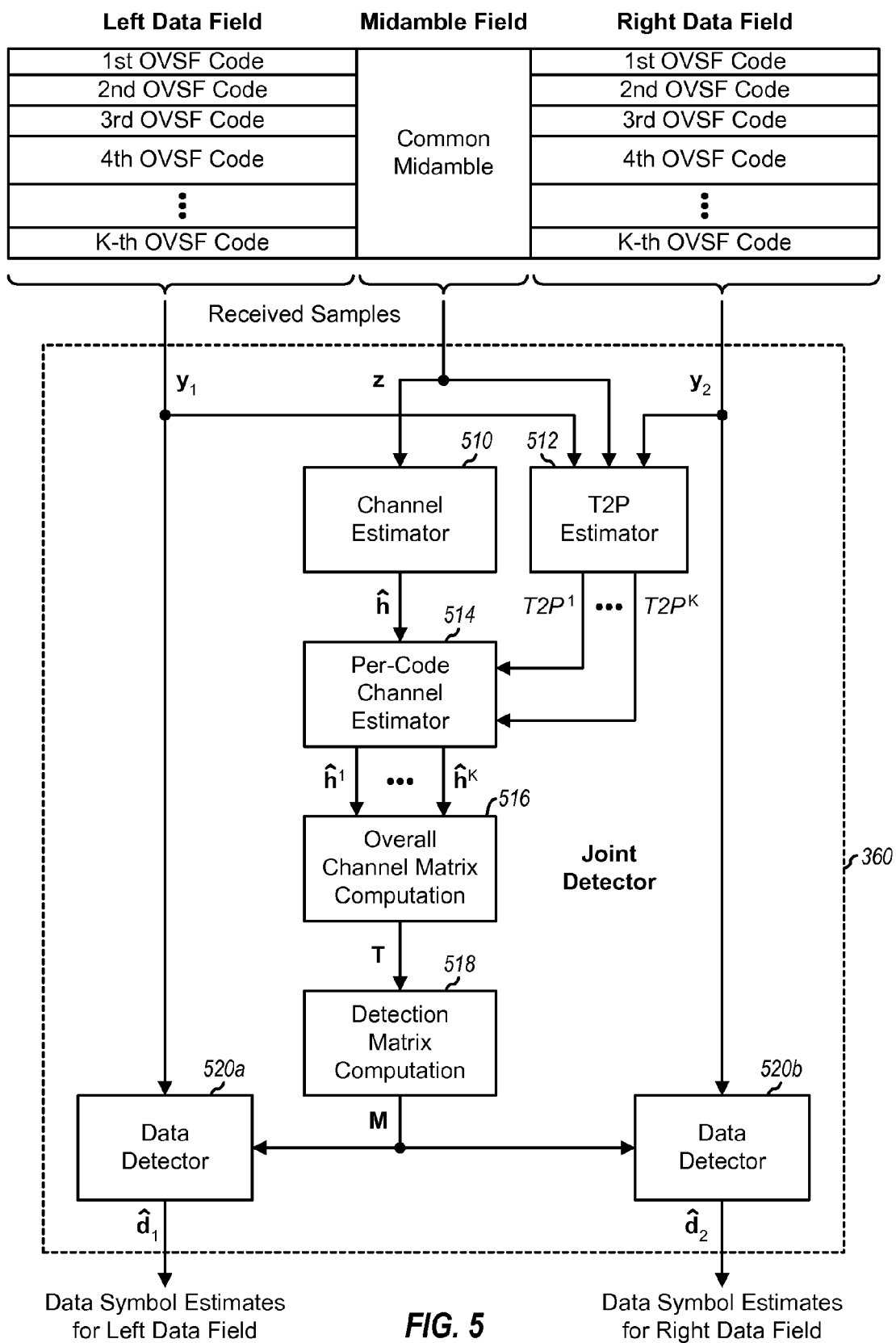
FIG. 5 shows a block diagram of a joint detector at the UE.

FIG. 5 shows a block diagram of a design of joint detector 360 at UE 120 in FIG. 3. Detector 360 performs channel estimation and joint detection for a downlink transmission from Node B 110 to UE 120. For simplicity, FIG. 5 shows processing for a case in which UE 120 is equipped with a single receive antenna.

Within joint detector 360, a channel estimator 510 may obtain received samples for the common midamble and may drive a channel impulse response estimate ĥ, e.g., as shown in equation (15). A T2P estimator 512 may obtain the received samples for the left and right data fields and determine the energy-per-symbol for each OVSF code, e.g., as shown in equation (17). T2P estimator 512 may also obtain the received samples for the common midamble and determine the energy of the common midamble, e.g., as shown in equation (18). T2P estimator 512 may then compute the T2P for each OVSF code, e.g., as shown in equation (19).

A unit 514 may compute a channel impulse response estimate $\hat{h}^k$ for each OVSF code based on the channel impulse response estimate ĥ and the T2P for that OVSF code, e.g., as shown in equation (16). A unit 516 may compute an overall channel matrix T based on the channel impulse response estimates for all OVSF codes. A unit 518 may compute a detection matrix M based on the overall channel matrix T, e.g., as shown in equation (25), (26), (27) or (28). A data detector 520*a* may obtain received samples for the left data field and the detection matrix M, perform joint detection on these received samples with the detection matrix M, and provide data symbol estimates for all OVSF codes of interest for the left data field, e.g., as shown in equation (29). Similarly, a data detector 520*b* may obtain received samples for the right data field and the detection matrix M, perform joint detection on these received samples with the detection matrix M, and provide data symbol estimates for all OVSF codes of interest for the right data field.

The matrices and vectors for joint detection may be relatively large. For example, the following parameter values may be used for the 3.84 Mcps Option:

$$N=61, Q=16, R=2, K=16, \text{ and } L=57. \quad \text{Eq (30)}$$

R·(N·Q+L−1)=2(61·16+57−1)=2064 rows for matrix T.
K·N=16·61=484 columns for matrix T.

Computation for joint detection may be reduced in various manners. In one design, the detection matrix M may be defined for data symbols for only the OVSF codes of interest and may then have fewer rows.

In another design, the energy-per-symbol $E_r^k$ for each OVSF code of each receive antenna may be compared against a threshold. Each OVSF code with $E_r^k$ below the threshold may be removed from consideration. Matrix T may then be defined for only OVSF codes with $E_r^k$ above the threshold.

In yet another design, the energy-per-symbol $E_r^k$ for each OVSF code that is not assigned to UE 120 may be compared against a set of G thresholds for G+1 groups. Each non-assigned OVSF code may be placed in one group based on the result of the comparison between $E_r^k$ and the G thresholds. All OVSF codes within each group may have similar energy-per-symbol values and may be treated as one OVSF code.

Joint detection by UE 120 for downlink transmission from one cell has been described above. Joint detection may also be extended to multiple cells. In this case, UE 120 may estimate the channel impulse responses for each cell of interest. UE 120 may also determine the energy-per-symbol $E_r^k$ for each OVSF code of each receive antenna for each cell of interest. UE may perform thresholding to remove OVSF codes with low energy and may generate a detection matrix M for all OVSF codes of sufficient energy for all cells of interest. Joint detection may thus be performed across all OVSF codes in all cells of interest. Thresholding may be performed to reduce computational complexity.

FIG. 6 shows a design of a process 600 for receiving data on the downlink in a wireless communication system. Process 600 may be performed by a UE (as described below) or by some other entity. The UE may obtain samples for a burst transmitted by a Node B on the downlink, with the burst comprising at least one data field and a common midamble (block 612). The burst may be transmitted to multiple UEs, and the data field(s) may comprise data symbols sent with multiple orthogonal codes (e.g., multiple OVSF codes) to the multiple UEs. The UE may be assigned at least one of the multiple orthogonal codes. The UE may derive multiple channel estimates for the multiple orthogonal codes based on samples for the common midamble and samples for the at least one data field (block 614). The UE may then perform joint detection, for the multiple orthogonal codes, on the samples for the at least one data field based on the multiple channel estimates (block 616).

FIG. 7 shows a design of a process for performing channel estimation in block 614 in FIG. 6. The multiple channel estimates for the multiple orthogonal codes may comprise multiple channel impulse response estimates. The UE may derive a first channel impulse response estimate based on the samples for the common midamble, e.g., as shown in equation (15) (block 712). The UE may estimate a T2P for each of the multiple orthogonal codes based on the samples for the at least one data field and the samples for the common midamble (block 714). The UE may then derive a channel impulse response estimate for each orthogonal code based on the first channel impulse response estimate and the T2P for that orthogonal code, e.g., as shown in equation (16) (716).

In one design of block 712, the UE may determine a channel estimation matrix based on a midamble code used for the common midamble, e.g., as shown in equation (9), (11) or (12). The UE may then apply the channel estimation matrix to the samples for the common midamble to obtain the first channel impulse response estimate, e.g., as shown in equation (15).

In one design of block 714, the UE may perform FHTs on the samples for the at least one data field to obtain despread symbols for a plurality of orthogonal codes, e.g., all possible orthogonal codes. The UE may perform thresholding and identify the multiple orthogonal codes as a subset of the plurality of orthogonal codes having energy-per-symbol exceeding a threshold. The UE may determine the energy-per-symbol for each orthogonal code based on despread symbols for that orthogonal code. The UE may also determine the energy of the common midamble based on the samples for the common midamble, e.g., as shown in equation (18). The UE may then determine the T2P for each orthogonal code based on the energy-per-symbol for that orthogonal code and the energy of the common midamble, e.g., as shown in equation (19).

FIG. 8 shows a design of a process for performing joint detection in block 616 in FIG. 6. The UE may determine an overall channel matrix based on the multiple channel estimates for the multiple orthogonal codes (block 812). The UE may determine each column of the overall channel matrix based on convolution of one of multiple channel impulse response estimates and a scrambling and spreading chip sequence for one of the multiple orthogonal codes. The UE may determine a detection matrix based on the overall channel matrix and in accordance with a matched filter detector, a least squares detector, an MMSE detector, or some other detector (block 814). The UE may then apply the detection matrix to the samples for each data field to obtain data symbol estimates for at least one of the multiple orthogonal codes for that data field (block 816).

In another design, joint detection may be performed for multiple orthogonal codes and multiple receive antennas. The UE may obtain samples for a burst from each of the multiple receive antennas. The UE may derive multiple channel estimates for the multiple orthogonal codes for each receive antenna based on samples from that receive antenna for the common midamble. The UE may then perform joint detection, for the multiple orthogonal codes and the multiple receive antennas, on samples from the multiple receive antennas for the at least one data field based on channel estimates for the multiple orthogonal codes for the multiple receive antennas.

In yet another design, joint detection may be performed for multiple orthogonal codes and multiple cells. The UE may obtain samples for multiple bursts sent by the multiple cells on the downlink, with each burst comprising at least one data field and a common midamble. The UE may derive multiple channel estimates for multiple orthogonal codes for each cell based on samples for the common midamble and a midamble code for that cell. The UE may then perform joint detection, for the multiple orthogonal codes and the multiple cells, on samples for the at least one data field based on multiple channel estimates for the multiple orthogonal codes for the multiple cells.

For clarity, FIGS. 6 to 8 describe joint detection for data transmission on the downlink. Joint detection for data transmission on the uplink may be performed in similar manner.

FIG. 9 shows a design of an apparatus 900 for receiving data on the downlink in a wireless communication system. Apparatus 900 includes a module 912 to obtain samples for a burst comprising at least one data field and a common midamble, a module 914 to derive multiple channel estimates for multiple orthogonal codes based on samples for the common midamble and samples for the at least one data field, and a module 916 to perform joint detection, for the multiple orthogonal codes, on the samples for the at least one data field based on the multiple channel estimates. The modules in FIG. 9 may comprise processors, electronics devices, hardware devices, electronics components, logical circuits, memories, software codes, firmware codes, etc., or any combination thereof Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of receiving data in a wireless communication system, comprising:
    obtaining samples for a burst comprising at least one data field and a common midamble;
    deriving multiple channel estimates for multiple orthogonal codes comprising multiple channel impulse response estimates based on samples for the common midamble and samples for the at least one data field, comprising:
        deriving a first channel impulse response estimate based on the samples for the common midamble,
        estimating a traffic-to-pilot ratio (T2P) for each of the multiple orthogonal codes based on the samples for the at least one data field and the samples for the common midamble, and
        deriving a second channel impulse response estimate for each of the multiple orthogonal codes based on the first channel impulse response estimate and the T2P for the orthogonal code; and
    performing joint detection, for the multiple orthogonal codes, on the samples for the at least one data field based on the multiple channel estimates.

2. The method of claim 1, further comprising:
    receiving at a user equipment (UE) the burst transmitted by a Node B to multiple UEs, the at least one data field of the burst comprising data symbols sent with the multiple orthogonal codes to the multiple UEs, and wherein the UE is assigned at least one of the multiple orthogonal codes.

3. The method of claim 1, wherein the estimating the T2P for each of the multiple orthogonal codes comprises
    performing fast Hadamard transforms (FHTs) on the samples for the at least one data field to obtain despread symbols for the multiple orthogonal codes,
    determining energy-per-symbol for each of the multiple orthogonal codes based on despread symbols for the orthogonal code,
    determining energy of the common midamble based on the samples for the common midamble, and
    determining the T2P for each of the multiple orthogonal codes based on the energy-per-symbol for the orthogonal code and the energy of the common midamble.

4. The method of claim 1, wherein the estimating the T2P for each of the multiple orthogonal codes comprises
    determining energy-per-symbol for each of a plurality of orthogonal codes based on the samples for the at least one data field,
    identifying the multiple orthogonal codes as a subset of the plurality of orthogonal codes having energy-per-symbol exceeding a threshold,
    determining energy of the common midamble based on the samples for the common midamble, and
    determining the T2P for each of the multiple orthogonal codes based on the energy-per-symbol for the orthogonal code and the energy of the common midamble.

5. The method of claim 1, wherein the deriving the first channel impulse response estimate comprises
    determining a channel estimation matrix based on a midamble code used for the common midamble, and
    applying the channel estimation matrix to the samples for the common midamble to obtain the first channel impulse response estimate.

6. The method of claim 5, wherein the determining the channel estimation matrix comprises determining the channel estimation matrix based on the midamble code and in accordance with a maximum likelihood channel estimator.

7. The method of claim 1, wherein the performing joint detection comprises
   determining an overall channel matrix based on the multiple channel estimates for the multiple orthogonal codes,
   determining a detection matrix based on the overall channel matrix, and
   applying the detection matrix to the samples for the at least one data field to obtain data symbol estimates for at least one of the multiple orthogonal codes.

8. The method of claim 7, wherein the multiple channel estimates for the multiple orthogonal codes comprise multiple channel impulse response estimates, and wherein the determining the overall channel matrix comprises determining each column of the overall channel matrix based on one of the multiple channel impulse response estimates and a scrambling and spreading chip sequence for one of the multiple orthogonal codes.

9. The method of claim 7, wherein the determining the detection matrix comprises determining the detection matrix based on the overall channel matrix and in accordance with a matched filter detector, a least squares detector, or a minimum mean square error (MMSE) detector.

10. The method of claim 1, wherein the at least one data field comprises a left data field and a right data field, wherein the deriving multiple channel estimates comprises deriving multiple channel impulse response estimates for the multiple orthogonal codes based on the samples for the common midamble and samples for the left and right data fields, and wherein the performing joint detection comprises
    determining a detection matrix based on the multiple channel impulse response estimates for the multiple orthogonal codes,
    applying the detection matrix to samples for the left data field to obtain data symbol estimates for at least one orthogonal code for the left data field, and
    applying the detection matrix to samples for the right data field to obtain data symbol estimates for the at least one orthogonal code for the right data field.

11. The method of claim 1, wherein the obtaining samples for a burst comprises obtaining samples for the burst from each of multiple receive antennas, wherein the deriving multiple channel estimates comprises deriving multiple channel estimates for the multiple orthogonal codes for each receive antenna based on samples from the receive antenna for the common midamble, and wherein the performing joint detection comprises performing joint detection, for the multiple orthogonal codes and the multiple receive antennas, on samples from the multiple receive antennas for the at least one data field based on channel estimates for the multiple orthogonal codes for the multiple receive antennas.

12. The method of claim 1, wherein the obtaining samples for a burst comprises obtaining samples for multiple bursts sent by multiple cells, each burst comprising the at least one data field and the common midamble, wherein the deriving multiple channel estimates comprises deriving multiple channel estimates for multiple orthogonal codes for each cell based on samples for the common midamble and a midamble code for the cell, and wherein the performing joint detection comprises performing joint detection, for the multiple orthogonal codes and the multiple cells, on samples for the at least one data field based on multiple channel estimates for the multiple orthogonal codes for the multiple cells.

13. An apparatus for wireless communication, comprising:
    at least one processor configured to:
    obtain samples for a burst comprising at least one data field and a common midamble;
    derive multiple channel estimates for multiple orthogonal codes comprising multiple channel impulse response estimates based on samples for the common midamble and samples for the at least one data field, comprising:
      deriving a first channel impulse response estimate based on the samples for the common midamble,
      estimating a traffic-to-pilot ratio (T2P) for each of the multiple orthogonal codes based on the samples for the at least one data field and the samples for the common midamble, and
      deriving a second channel impulse response estimate for each of the multiple orthogonal codes based on the first channel impulse response estimate and the T2P for the orthogonal code; and
    perform joint detection, for the multiple orthogonal codes, on the samples for the at least one data field based on the multiple channel estimates.

14. The apparatus of claim 13, wherein the at least one processor is configured to perform fast Hadamard transforms (FHTs) on the samples for the at least one data field to obtain despread symbols for the multiple orthogonal codes, to determine energy-per-symbol for each of the multiple orthogonal codes based on despread symbols for the orthogonal code, to determine energy of the common midamble based on the samples for the common midamble, and to determine the T2P for each of the multiple orthogonal codes based on the energy-per-symbol for the orthogonal code and the energy of the common midamble.

15. The apparatus of claim 13, wherein the at least one processor is configured to determine a channel estimation matrix based on a midamble code used for the common midamble, and to apply the channel estimation matrix to the samples for the common midamble to obtain the first channel impulse response estimate.

16. The apparatus of claim 13, wherein the at least one processor is configured to determine an overall channel matrix based on the multiple channel estimates for the multiple orthogonal codes, to determine a detection matrix based on the overall channel matrix, and to apply the detection matrix to the samples for the at least one data field to obtain data symbol estimates for at least one of the multiple orthogonal codes.

17. The apparatus of claim 16, wherein the at least one processor is configured to determine each column of the overall channel matrix based on one of multiple channel impulse response estimates and a scrambling and spreading chip sequence for one of the multiple orthogonal codes.

18. The apparatus of claim 13, wherein the at least one data field comprises a left data field and a right data field, and wherein the at least one processor is configured to derive multiple channel impulse response estimates for the multiple orthogonal codes based on the samples for the common midamble and samples for the left and right data fields, to determine a detection matrix based on the multiple channel impulse response estimates for the multiple orthogonal codes, to apply the detection matrix to samples for the left data field to obtain data symbol estimates for at least one orthogonal code for the left data field, and to apply the detection matrix to samples for the right data field to obtain data symbol estimates for the at least one orthogonal code for the right data field.

19. An apparatus for wireless communication, comprising:
means for obtaining samples for a burst comprising at least one data field and a common midamble;
means for deriving multiple channel estimates for multiple orthogonal codes comprising multiple channel impulse response estimates based on samples for the common midamble and samples for the at least one data field, comprising:
  means for deriving a first channel impulse response estimate based on the samples for the common midamble,
  means for estimating a traffic-to-pilot ratio (T2P) for each of the multiple orthogonal codes based on the samples for the at least one data field and the samples for the common midamble, and
  means for deriving a second channel impulse response estimate for each of the multiple orthogonal codes based on the first channel impulse response estimate and the T2P for the orthogonal code; and
means for performing joint detection, for the multiple orthogonal codes, on the samples for the at least one data field based on the multiple channel estimates.

20. The apparatus of claim 19, wherein the means for estimating the T2P for each of the multiple orthogonal codes comprises
  means for performing fast Hadamard transforms (FHTs) on the samples for the at least one data field to obtain despread symbols for the multiple orthogonal codes,
  means for determining energy-per-symbol for each of the multiple orthogonal codes based on despread symbols for the orthogonal code,
  means for determining energy of the common midamble based on the samples for the common midamble, and
  means for determining the T2P for each of the multiple orthogonal codes based on the energy-per-symbol for the orthogonal code and the energy of the common midamble.

21. The apparatus of claim 19, wherein the means for deriving the first channel impulse response estimate comprises
  means for determining a channel estimation matrix based on a midamble code used for the common midamble, and
  means for applying the channel estimation matrix to the samples for the common midamble to obtain the first channel impulse response estimate.

22. The apparatus of claim 19, wherein the means for performing joint detection comprises
  means for determining an overall channel matrix based on the multiple channel estimates for the multiple orthogonal codes,
  means for determining a detection matrix based on the overall channel matrix, and
  means for applying the detection matrix to the samples for the at least one data field to obtain data symbol estimates for at least one of the multiple orthogonal codes.

23. The apparatus of claim 22, wherein the multiple channel estimates for the multiple orthogonal codes comprise multiple channel impulse response estimates, and wherein the means for determining the overall channel matrix comprises means for determining each column of the overall channel matrix based on one of the multiple channel impulse response estimates and a scrambling and spreading chip sequence for one of the multiple orthogonal codes.

24. The apparatus of claim 19, wherein the at least one data field comprises a left data field and a right data field, wherein the means for deriving multiple channel estimates comprises means for deriving multiple channel impulse response estimates for the multiple orthogonal codes based on the samples for the common midamble and samples for the left and right data fields, and wherein the means for performing joint detection comprises
  means for determining a detection matrix based on the multiple channel impulse response estimates for the multiple orthogonal codes,
  means for applying the detection matrix to samples for the left data field to obtain data symbol estimates for at least one orthogonal code for the left data field, and
  means for applying the detection matrix to samples for the right data field to obtain data symbol estimates for the at least one orthogonal code for the right data field.

25. A computer program product, comprising:
a non-transitory computer-readable medium comprising:
  code for causing at least one computer to obtain samples for a burst comprising at least one data field and a common midamble;
  code for causing the at least one computer to derive multiple channel estimates for multiple orthogonal codes comprising multiple channel impulse response estimates based on samples for the common midamble and samples for the at least one data field, comprising:
    code for causing the at least one computer to derive a first channel impulse response estimate based on the samples for the common midamble,
    code for causing the at least one computer to estimate a traffic-to-pilot ratio (T2P) for each of the multiple orthogonal codes based on the samples for the at least one data field and the samples for the common midamble, and
    code for causing the at least one computer to derive a second channel impulse response estimate for each of the multiple orthogonal codes based on the first channel impulse response estimate and the T2P for the orthogonal code; and
  code for causing the at least one computer to perform joint detection, for the multiple orthogonal codes, on the samples for the at least one data field based on the multiple channel estimates.

26. The computer program product of claim 25, wherein the computer-readable medium further comprises:
  code for causing the at least one computer to determine an overall channel matrix based on the multiple channel estimates for the multiple orthogonal codes;
  code for causing the at least one computer to determine a detection matrix based on the overall channel matrix; and
  code for causing the at least one computer to apply the detection matrix to the samples for the at least one data field to obtain data symbol estimates for at least one of the multiple orthogonal codes.

* * * * *